(12) United States Patent
Oya

(10) Patent No.: US 7,996,283 B2
(45) Date of Patent: Aug. 9, 2011

(54) SYSTEM, METHOD, AND STORAGE MEDIUM FOR INVENTORY MANAGEMENT OF EXPENDABLE SUPPLIES USED IN PRINTING DEVICES

(75) Inventor: Takeshi Oya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1415 days.

(21) Appl. No.: 10/419,946

(22) Filed: Apr. 22, 2003

(65) Prior Publication Data

US 2004/0002905 A1    Jan. 1, 2004

(30) Foreign Application Priority Data

Apr. 22, 2002   (JP) .................................. 2002-119206
Apr. 2, 2003    (JP) .................................. 2003-099303

(51) Int. Cl.
*G06Q 10/00*      (2006.01)
*G03G 15/00*      (2006.01)
(52) U.S. Cl. .................. 705/28; 399/1; 399/8
(58) Field of Classification Search .......... 399/24, 399/1, 8; 705/28
See application file for complete search history.

(56) References Cited

U.S. PATENT DOCUMENTS

| | | | | |
|---|---|---|---|---|
| 5,594,529 A | * | 1/1997 | Yamashita et al. | 399/8 |
| 5,671,362 A | * | 9/1997 | Cowe et al. | 705/28 |
| 5,983,202 A | * | 11/1999 | Yabe et al. | 705/28 |
| 6,023,593 A | * | 2/2000 | Tomidokoro | 399/8 |
| 6,370,341 B1 | * | 4/2002 | Haines | 399/24 |
| 6,672,695 B1 | * | 1/2004 | Naka et al. | 347/7 |
| 7,061,391 B2 | * | 6/2006 | Hopper et al. | 340/691.1 |
| 7,062,451 B1 | * | 6/2006 | Dentel et al. | 705/26 |
| 2001/0004734 A1 | * | 6/2001 | Kudoh et al. | 705/26 |
| 2001/0027429 A1 | * | 10/2001 | Uemura | 705/27 |
| 2002/0071137 A1 | * | 6/2002 | Haines et al. | 358/1.15 |
| 2002/0072998 A1 | * | 6/2002 | Haines et al. | 705/28 |
| 2002/0099630 A1 | * | 7/2002 | Aruga et al. | 705/28 |
| 2003/0050873 A1 | * | 3/2003 | Niki | 705/28 |
| 2004/0103048 A1 | * | 5/2004 | Vitulli et al. | 705/28 |

FOREIGN PATENT DOCUMENTS

| | | |
|---|---|---|
| JP | 1-162606 | 6/1989 |
| JP | 8-147124 | 6/1996 |
| JP | 8-152817 | 6/1996 |
| JP | 8-152824 | 11/1996 |
| JP | 8-301410 | 11/1996 |
| JP | 202-29612 | 1/2002 |

OTHER PUBLICATIONS

Cullen, Cheryl Dangel, Optimizing your ink room, Jul. 2001, American Printer, pp. 20-21.*

* cited by examiner

*Primary Examiner* — Scott Zare
(74) *Attorney, Agent, or Firm* — Fitzpatrick, Cella, Harper & Scinto

(57) ABSTRACT

It is an object of the present invention to provide a mechanism for efficiently performing inventory management, including storage places, of expendable supplies to be used in devices. Storage place information in which held storage places and classifications of expendable supplies are associated with each other is updated based upon an association of a designated storage place and a specified classification of expendable supplies.

3 Claims, 13 Drawing Sheets

FIRST EMBODIMENT FLOWCHART

FIRST EMBODIMENT DIAGRAM

FIG. 2
FIRST EMBODIMENT  INFORMATION EXAMPLE 1

| DEVICE ID | CONNECTION ADDRESS | MODEL CODE | STORAGE PLACE ID | STATE |
|---|---|---|---|---|
| DEV001 | 10.1.1.1 | MFP0001 | 0001 | 0 |
| DEV002 | 10.1.1.81 | PP0010 | 0002 | 0 |
| DEV003 | 10.1.1.21 | MFP0001 | 0002 | 0 |

FIG. 3
FIRST EMBODIMENT  INFORMATION EXAMPLE 2

| MODEL CODE | NAME OF EXPENDABLE SUPPLIES | CODE OF EXPENDABLE SUPPLIES | FORM | CLASSIFICATION |
|---|---|---|---|---|
| MFP0001 | TONER FOR HIGH-SPEED PRINTER (K) | GP001_K | 3 | 0 |
| MFP0001 | TONER FOR HIGH-SPEED PRINTER (Y) | GP001_Y | 3 | 1 |
| MFP0001 | TONER FOR HIGH-SPEED PRINTER (M) | GP001_M | 3 | 2 |
| MFP0001 | TONER FOR HIGH-SPEED PRINTER (C) | GP001_C | 3 | 3 |
| MFP0001 | WASTE TONER BOTTLE | GP001_W | 4 | 0 |
| PP0010 | GENERAL PURPOSE TONER (K) | PP001_K | 3 | 0 |
| BJ0001 | PHOTOGRAPH INK FOR BJ K01 | BI001_K01 | 5 | 0 |
| BJ0001 | PHOTOGRAPH INK FOR BJ K02 | BI001_K02 | 5 | 0 |
| BJ0001 | PHOTOGRAPH INK FOR BJ Y11 | BI001_Y11 | 5 | 1 |
| BJ0001 | PHOTOGRAPH INK FOR BJ Y12 | BI001_Y12 | 5 | 1 |
| BJ0001 | PHOTOGRAPH INK FOR BJ M21 | BI001_M21 | 5 | 2 |
| BJ0001 | PHOTOGRAPH INK FOR BJ M22 | BI001_M22 | 5 | 2 |
| BJ0001 | PHOTOGRAPH INK FOR BJ C21 | BI001_C21 | 5 | 3 |
| BJ0001 | PHOTOGRAPH INK FOR BJ C22 | BI001_C22 | 5 | 3 |

FIG. 4

FIRST EMBODIMENT  INFORMATION EXAMPLE 3

| STORAGE PLACE ID | NAME | NAME OF ADMINISTRATOR | CONTACT |
|---|---|---|---|
| 0001 | FIRST FLOOR: GENERAL AFFAIRS | KIYOMI SUZUKI | |
| 0002 | SECOND FLOOR: PLANNING 1 | MUNEO TSUJIMOTO | |

FIG. 5

FIRST EMBODIMENT  INFORMATION EXAMPLE 4

| STORAGE PLACE ID | PART NUMBER | QUANTITY OF INVENTORIES |
|---|---|---|
| 0001 | GP001_K | 4 |
| 0001 | GP001_Y | 4 |
| 0001 | GP001_M | 4 |
| 0001 | GP001_C | 4 |
| 0001 | GP001_W | 2 |
| 0002 | GP001_K | 3 |
| 0002 | GP001_Y | 5 |
| 0002 | GP001_M | 5 |
| 0002 | GP001_C | 5 |
| 0002 | GP001_W | 3 |
| 0002 | PP001_K | 2 |

FIG. 6

FIRST EMBODIMENT INFORMATION OF 114

| MODEL CODE | NAME OF EXPENDABLE SUPPLIES | CODE OF EXPENDABLE SUPPLIES | FORM | CLASSIFICATION |
|---|---|---|---|---|
| MFP0001 | TONER FOR HIGH-SPEED PRINTER (K) | GP001_K | 3 | 0 |
| MFP0001 | TONER FOR HIGH-SPEED PRINTER (Y) | GP001_Y | 3 | 1 |
| MFP0001 | TONER FOR HIGH-SPEED PRINTER (M) | GP001_M | 3 | 2 |
| MFP0001 | TONER FOR HIGH-SPEED PRINTER (C) | GP001_C | 3 | 3 |
| MFP0001 | WASTE TONER BOTTLE | GP001_W | 4 | 0 |
| PP0010 | GENERAL PURPOSE TONER (K) | PP001_K | 3 | 0 |
| BJ0001 | PHOTOGRAPH INK FOR BJ K01 | BI001_K01 | 5 | 0 |
| BJ0001 | PHOTOGRAPH INK FOR BJ K02 | BI001_K02 | 5 | 0 |
| BJ0001 | PHOTOGRAPH INK FOR BJ Y11 | BI001_Y11 | 5 | 1 |
| BJ0001 | PHOTOGRAPH INK FOR BJ Y12 | BI001_Y12 | 5 | 1 |
| BJ0001 | PHOTOGRAPH INK FOR BJ Y13 | BI001_Y13 | 5 | 1 |
| BJ0001 | PHOTOGRAPH INK FOR BJ M21 | BI001_M21 | 5 | 2 |
| BJ0001 | PHOTOGRAPH INK FOR BJ M22 | BI001_M22 | 5 | 2 |
| BJ0001 | PHOTOGRAPH INK FOR BJ M23 | BI001_M23 | 5 | 2 |
| BJ0001 | PHOTOGRAPH INK FOR BJ C31 | BI001_C31 | 5 | 3 |
| BJ0001 | PHOTOGRAPH INK FOR BJ C32 | BI001_C32 | 5 | 3 |
| BJ0001 | PHOTOGRAPH INK FOR BJ C33 | BI001_C33 | 5 | 3 |
| MFPH0001 | TONER FOR HIGH-SPEED PRINTER H (K) | SSH001_K | 1 | 0 |
| MFPH0002 | TONER FOR HIGH-SPEED PRINTER H2 (K) | SSH002_K | 1 | 0 |

FIRST EMBODIMENT FLOWCHART

FIG. 8

FIRST EMBODIMENT PROCESSING RESULT EXAMPLE 1

| DEVICE ID | CONNECTION ADDRESS | MODEL CODE | STORAGE PLACE ID | STATE |
|---|---|---|---|---|
| DEV001 | 10.1.1.1 | MFP0001 | 0001 | 0 |
| DEV002 | 10.1.1.81 | BJ0001 | 0002 | 0 |
| DEV003 | 10.1.1.21 | MFP0001 | 0002 | 0 |
| DEV004 | 10.1.1.22 | MFPH0002 | 0001 | 0 |

FIG. 9

FIRST EMBODIMENT PROCESSING RESULT EXAMPLE 2

| STORAGE PLACE ID | PART NUMBER | QUANTITY OF INVENTORIES |
|---|---|---|
| 0001 | GP001_K | 4 |
| 0001 | GP001_Y | 4 |
| 0001 | GP001_M | 4 |
| 0001 | GP001_C | 4 |
| 0001 | GP001_W | 2 |
| 0002 | GP001_K | 3 |
| 0002 | GP001_Y | 5 |
| 0002 | GP001_M | 5 |
| 0002 | GP001_C | 5 |
| 0002 | GP001_W | 3 |
| 0002 | PP001_K | 2 |
| 0001 | SSH002_K | 0 |

SECOND EMBODIMENT DIAGRAM

FIG. 12

SECOND EMBODIMENT  PRODUCT INFORMATION EXAMPLE IN 1006

| MODEL CODE | NAME OF EXPENDABLE SUPPLIES | CODE OF EXPENDABLE SUPPLIES | FORM | CLASSIFICATION |
|---|---|---|---|---|
| MFP0001 | TONER FOR HIGH-SPEED PRINTER (K) | GP001_K | 3 | 0 |
| MFP0001 | TONER FOR HIGH-SPEED PRINTER (Y) | GP001_Y | 3 | 1 |
| MFP0001 | TONER FOR HIGH-SPEED PRINTER (M) | GP001_M | 3 | 2 |
| MFP0001 | TONER FOR HIGH-SPEED PRINTER (C) | GP001_C | 3 | 3 |
| MFP0001 | WASTE TONER BOTTLE | GP001_W | 4 | 0 |
| PP0010 | GENERAL PURPOSE TONER (K) | PP001_K | 3 | 0 |

FIG. 13

SECOND EMBODIMENT TRANSFER DATA EXAMPLE OF PRODUCT INFORMATION

```
<PRODUCT INFORMATION>
<MODEL CODE>MFPH0002</MODEL CODE>
<NUMBER OF EXPENDABLE SUPPLIES>1</NUMBER OF EXPENDABLE SUPPLIES>
<EXPENDABLE SUPPLIES>
<NAME OF EXPENDABLE SUPPLIES>TONER FOR HIGH-SPEED PRINTER H2 (K)</NAME OF EXPENDABLE SUPPLIES>
<CODE OF EXPENDABLE SUPPLIES>SSH002_K</CODE OF EXPENDABLE SUPPLIES>
<FORM>1</FORM>
<CLASSIFICATION>0</CLASSIFICATION>
</EXPENDABLE SUPPLIES>
</PRODUCT INFORMATION>
```

FIG. 14

SECOND EMBODIMENT UPDATED PRODUCT INFORMATION

| MODEL CODE | NAME OF EXPENDABLE SUPPLIES | CODE OF EXPENDABLE SUPPLIES | FORM | CLASSIFICATION |
|---|---|---|---|---|
| MFP0001 | TONER FOR HIGH-SPEED PRINTER (K) | GP001_K | 3 | 0 |
| MFP0001 | TONER FOR HIGH-SPEED PRINTER (Y) | GP001_Y | 3 | 1 |
| MFP0001 | TONER FOR HIGH-SPEED PRINTER (M) | GP001_M | 3 | 2 |
| MFP0001 | TONER FOR HIGH-SPEED PRINTER (C) | GP001_C | 3 | 3 |
| MFP0001 | WASTE TONER BOTTLE | GP001_W | 4 | 0 |
| PP0010 | GENERAL PURPOSE TONER (K) | PP001_K | 3 | 0 |
| MFPH0002 | TONER FOR HIGH-SPEED PRINTER H2 (K) | SSH002_K | 1 | 0 |

THIRD EMBODIMENT DIAGRAM

THIRD EMBODIMENT FLOWCHART

SYSTEM, METHOD, AND STORAGE MEDIUM FOR INVENTORY MANAGEMENT OF EXPENDABLE SUPPLIES USED IN PRINTING DEVICES

BACKGROUND OF THE INVENTION

1. Field of the Invention

The present invention relates to a mechanism which, in management of a device such as a copier or a printer existing in a local network, performs inventory management of expendable supplies to be used in the device.

2. Related Background Art

As a technique for performing inventory management of toner cartridges to be used in OA equipment, as disclosed in Japanese Patent Application Laid-Open No. 08-152824, there is known a mechanism in which a copier management device connected to a copier in a one to one relationship receives a toner empty signal or data of the number of sheets for each sheet feed cassette and, for example, updates inventory data of toner cartridges in response to receiving the toner empty signal.

However, according to the mechanism which has been conventionally known, only the number of stocks of expendable supplies is taken notice of. Nevertheless, actually, a place for storing expendable supplies may be determined in an office or the like, and it becomes necessary to manage such a storage place of expendable supplies accurately as well.

In addition, in inventory management of expendable supplies involving management of a storage place, for example, in the case in which expendable supplies of a new classification are placed on the market, management such as providing a storage place anew is necessary, which forces an administrator to carry out extremely complicated work. It is expected that a mechanism for improving such a situation is realized.

SUMMARY OF THE INVENTION

The present invention has been devised in view of the above problems, and it is an object of the present invention to provide a mechanism which is an information processing apparatus provided with an inventory management function for expendable supplies used for each of a plurality of printing apparatuses, which is characterized by including: a holding unit which holds storage place information in which storage places and classifications of expendable supplies are associated with each other; and an updating unit which updates the storage place information held in the holding unit based upon association of a designated storage place and a specified classification of expendable supplies.

In addition, it is another object of the present invention to provide a mechanism which is an information processing apparatus capable of communicating with a server holding information necessary for managing states of a plurality of devices and the number of stocks of expendable supplies to be used by the devices, which is characterized by including: a connection unit which makes connection with the devices and a server provided with product information for performing inventory management; a holding unit which holds connection information for connection by the connection unit; an acquisition unit which acquires product information, in which models of the devices and classifications of expendable supplies are associated with each other, from the server; and a preparation unit which prepares storage place information of expendable supplies corresponding to a model of a printing apparatus based upon product information acquired by the acquisition unit.

As described above, according to the present invention, a mechanism can be realized which can perform inventory management including management of a storage place of expendable supplies efficiently without forcing an administrator to carry out complicated work compared with the conventional mechanism.

BRIEF DESCRIPTION OF THE DRAWINGS

In the accompanying drawings:

FIG. 2 is a table showing an information example 1 of the first embodiment;

FIG. 3 is a table showing an information example 2 of the first embodiment;

FIG. 4 is a table showing an information example 3 of the first embodiment;

FIG. 5 is a table showing an information example 4 of the first embodiment;

FIG. 6 is a table showing information of data 114 of the first embodiment;

FIG. 8 is a table showing a processing result example 1 of the first embodiment;

FIG. 9 is a table showing a processing result example 2 of the first embodiment;

FIG. 12 is a table showing a product information example in a DB for management 1006 of the second embodiment;

FIG. 13 is a table showing a transferred data example of product information of the second embodiment;

FIG. 14 is a table showing updated product information of the second embodiment;

DETAILED DESCRIPTION OF THE PREFERRED EMBODIMENTS (First Embodiment)

Figure 1:
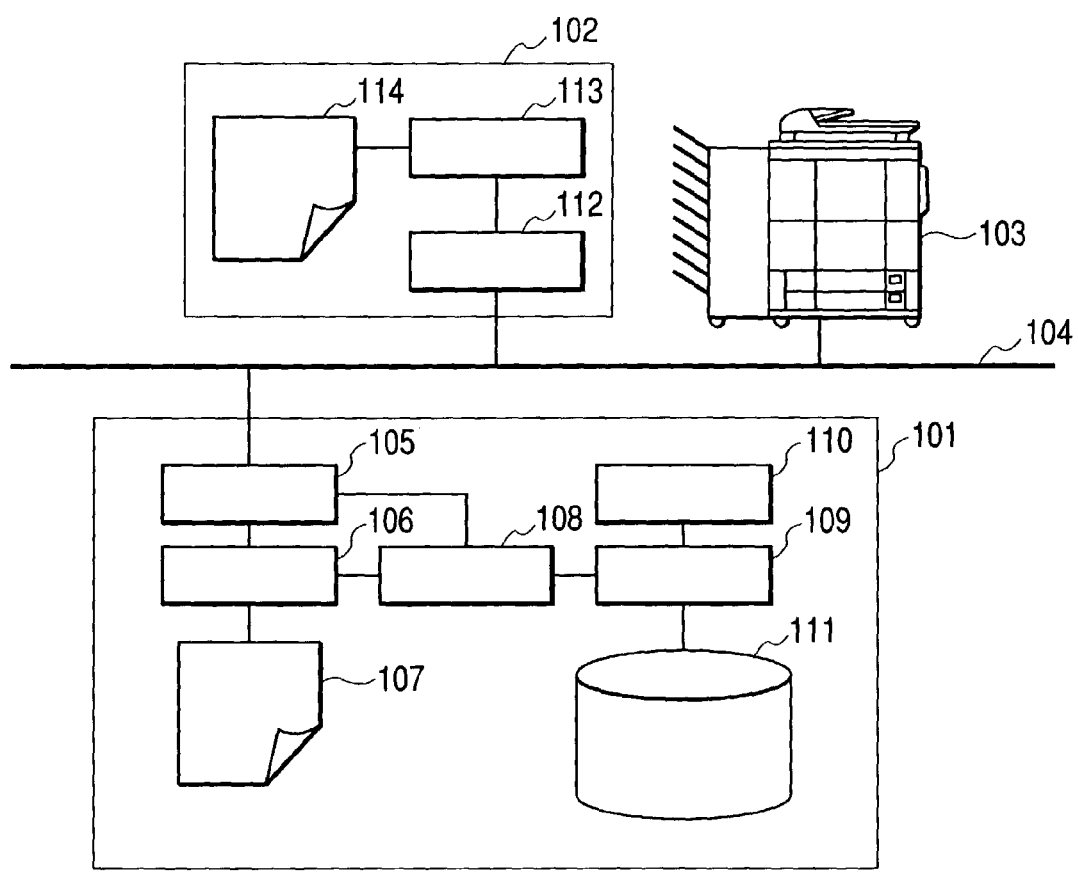
FIG. 1 is a diagram showing a first embodiment of the present invention.

FIG. 1 is a diagram according a first aspect of the present invention. In the figure, reference numeral 101 denotes a management system; 102, an external server which holds product information; and 103, a device to be a management object. As the device, a printer or the like is assumed as representative equipment, and each embodiment will be described with a printer as an example of the device. In addition, the device is not limited to a printer of an electrophotographic system or an ink jet system, and various image forming apparatuses such as a digital composite machine provided with copying and printer functions can be applied as the device. Moreover, although only one device is shown in FIG. 1, as described later, this management system 101 manages a plurality of devices covering a plurality of models. Reference numeral 104 denotes a network for connecting the management system 101 and the external server 102. Reference numeral 105 denotes a communication control section for communicating with the external server 102 and the device 103 via the network 104. Reference numeral 106 denotes a file transfer section for acquiring a file from the external server 102. Reference numeral 107 denotes a configuration file, which is necessary for the file transfer section 106 to transfer a file from the external server 102, and includes a network address, a login name and a password of the external server 102, and a file arrangement place on the external server 102. Reference numeral 108 denotes a product information acquisition section for acquiring product information. Reference numeral 109 denotes a management system program main body, which performs registration, management, deletion, and the like of a management object. Reference numeral 110 denotes a command processing section which controls command processing applied to a management program. Reference numeral 111 denotes a DB for management of the management system program main body 109, which includes information for managing a device and managing expendable supplies used by the device and the number of stocks thereof. Reference numeral 112 denotes a communication control section for communicating with the management system 101 via the network 104. Reference numeral 113 denotes a data transmission section which receives a request from the management system 101 to send data. Reference numeral 114 denotes data to be sent to the management system 101.

FIGS. 2, 3, 4 and 5 shows a part of information included in the DB for management 111. The information shown in FIG. 2 is information for each management object device. Device IDs which do not duplicate are allocated to management object devices, and the information includes data indicating connection addresses of the object devices, model codes, IDs of storage places of expendable supplies and present operation states. The information of FIGS. 2, 3, 4 and 5 included in the DB for management 111 is arranged such that the information can be inspected appropriately by, for example, being displayed an a display section provided in the management system 101 or a display section of a predetermined external apparatus capable of exchanging information with the management system 101 via a communication line.

Information shown in FIG. 3 is information in which model codes and expendable supplies codes are associated with each other. Information shown in FIG. 4 is information concerning storage places and includes IDs of the storage places and names of the storage places, and names of administrators and contacts. Information shown in FIG. 5 is information concerning storage places managed by the management system 101 and includes IDs of the storage places, names, codes, forms, and classifications of expendable supplies held in the storage places.

Various models of printer devices exist, and there are many cases in which expendable supplies of the same type are handled by printer devices of different models. That is, in a form in which a storage place of expendable supplies is managed for each printer device, expendable supplies of duplicating classifications are managed in various storage places, which forces administrators of expendable supplies to carry out extremely complicated work. However, according to information on storage place management of FIG. 5, since storage places are associated and managed for each classification of expendable supplies, it becomes possible to provide management information which is easy to understand for the administrators.

In addition, the number of stocks of expendable supplies for each color is managed together with storage places in the information concerning storage places of FIG. 5, and in this regard, management can also be realized which is easy to understand compared with the form of managing storage places for each device.

FIG. 6 shows data described in data 114.

Figure 7:
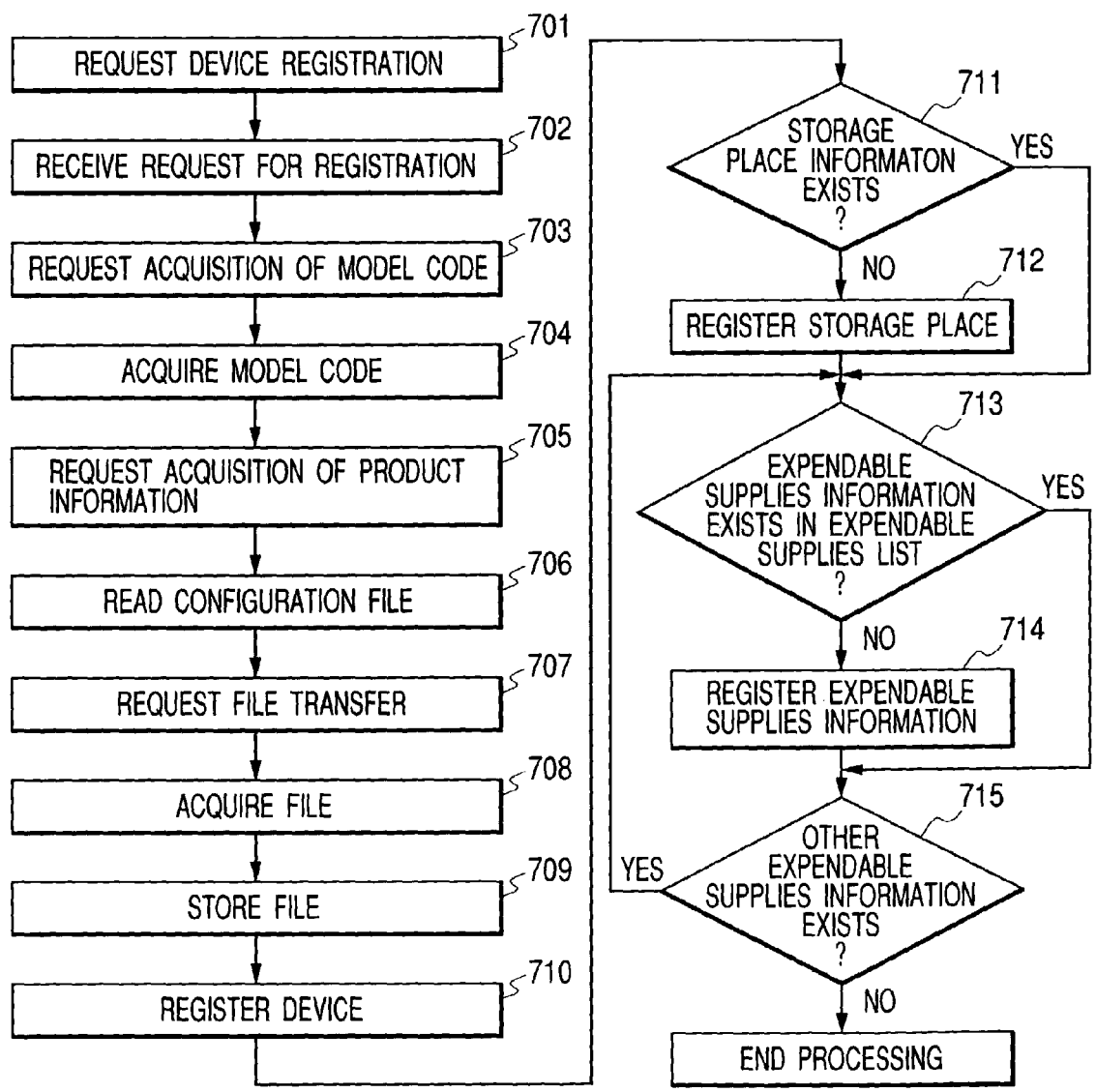
FIG. 7 is a flowchart of the first embodiment.

FIG. 7 shows a flowchart of this embodiment. With reference to this flowchart, description will be made on an operation of this embodiment for updating the storage place information, in which storage places and classifications of expendable supplies are associated with each other and which is held in a predetermined storage section of the management system 101, based upon association of a designated storage place and a specified classification of expendable supplies in inventory management of expendable supplies to be used for each of a plurality of printing apparatuses.

A request for registration of the device 103 is sent from the command processing section 110 together with designation of a storage place ID (701). At this point, a storage place ID to be associated with information (IP address, etc.) connectable with a registered device is passed to the management system program main body 109. The input of the designation of a storage place and the request for registration of the device 103 (connectable information) may be an input to the command processing section 110 via an input to inputting means provided in the management system 101, or may be an input to the command processing section 110 based upon designation from a predetermined external apparatus which is capable of communicating with the management system via a communication line.

The management system program main body 109 receives the request for registration (702), passes the connection information to the product information acquisition section 108, and requests the product information acquisition section 108 to acquire a model code (703). Note that, although the connection information is described above with an IP address as an example, information such as an MAC address or a device name can be applied as long as a device can be specified to establish communication using the information.

Upon receiving the request, the product information acquisition section 108 acquires a model code from the device 103 connecting to the network 104 via the communication control section 105 (704). This model code exists in the device 103 in advance and is transferred through an SNMP protocol. The model code is registered in determined MIB data in advance. The product information acquisition section 108 further requests the file transfer section 106 to acquire product information (705).

The file transfer section 106 reads information of a server holding product information from the configuration file 107, makes connection with the external server 102 described in the information read in step 706 (707), and acquires the product information (708). In a state of a plurality of devices and in an environment in which a management system for managing the number of stocks of expendable supplies used by the devices and a server for holding information necessary for management in the management system are connected logically, it becomes possible to acquire product information from the server at the time when a management object is added in the management system. In the case in which a new product is developed after the management system 101 is operated, it is necessary to input this product information in the management system 101 and it is also necessary for an administrator of the management system to periodically update the product information or update product information according to a product to be registered at the time when the registration is necessary. Such a problem is solved by the processing of this step 708.

The product information acquisition section 108 passes the transferred product information and model code to the management system program main body 109. The management system program main body 109 stores the product information in the DB for management 111 (709). This processing of step 709 corresponds to replacement of data shown in FIG. 3 with new data shown in FIG. 6.

Returning to the description of FIG. 7, the management system program main body 109 generates a device ID which does not duplicate in the DB for management 111, and records the model code acquired from the product information acquisition section 108 and the storage place and the connectable information acquired from the command processing section 110 in the DB for management 111 to perform device registration (710). This is addition of a device associated with various kinds of information to the data shown in FIG. 2 and, more specifically, corresponds to changing FIG. 2 into management information shown in FIG. 8 as described later. Subsequently, if the storage place ID passed from the command processing section 110 does not exist in the information shown in FIG. 4 in step 711, information on the storage place is added to FIG. 4 (712). In addition, if the storage place ID passed from the command processing section 110 exists in the information shown in FIG. 4, the processing is shifted to step 713.

Subsequently, relating expendable supplies information is extracted based upon the product information and the model code (712), and it is evaluated, in conjunction with the storage place passed from the command processing section 110, if the information shown in FIG. 5 has already been registered (713). If it is not registered, registration of information on the storage place and the model as a pair is added to FIG. 5 (714). Then, the processing from 712 to 714 is repeated until the pertinent unprocessed information is removed from the product information (715).

FIGS. 8 and 9 show an example of processing results. A request for registration of a device of connection address of 10.1.1.22 with a storage place ID as 0001 is sent from the command processing section 110 (step 701), and it is assumed that a model code of the device is MFPH0002 (step 704). The data shown in FIGS. 2 to 5 exists in the DB for management 111, and the information shown in FIG. 2 is changed to the information shown in FIG. 8 and the information shown in FIG. 5 is changed to the information shown in FIG. 9 as a result of the processing. The information shown in FIG. 3 is replaced with the information shown in FIG. 6 acquired from the data 114.

As a result, product information is automatically acquired from the outside when a device is registered in this system, whereby new information not held in the system can be acquired automatically, and product information and management data can be registered. Thus, even in the case in which a printer device of a new model placed on the market anew is set in a user destination, since the latest product information as shown in FIG. 6 is held by the management system 101, a corresponding classification of expendable supplies can be specified based upon the model code acquired from the printer device set anew and, at the same time, the storage place information shown in FIG. 5 can be updated to that shown in FIG. 9 based upon the specified classification of expendable supplies and inputted information indicating a storage place.

Although the SNMP is used for the acquisition of a model code in this embodiment, the same function can be realized by any method as long as a management system and a device are capable of exchanging information with the method. In addition, although a model code is acquired from a device in this embodiment, there is also a method of passing a model code directly from the command processing section 110. These methods do not affect the main object of the present invention at all.

As described above, according to the first embodiment, in association with acquiring a model code from a device via a network, according to the processing of step 704, it has become possible to prepare management information of expendable supplies corresponding to the acquired model code without bothering a user.

Moreover, in the processing of steps 712 and 713, since a new correspondence relationship between expendable supplies information, which is specified based upon a model code acquired from a device and product information, and an inputted storage place ID can be automatically judged (evaluated), it has become possible to prepare inventory management information (storage place information) on where expendable supplies of various models are stored (storage place information) efficiently without duplication. For example, the case is assumed in which a correspondence relationship between a predetermined storage place and expendable supplies of a predetermined classification is duplicated and two records are registered in the storage place information of FIG. 5. In this case, in response to notification of toner low including device specification information (device ID, etc.) sent from the device to the management system 101, when the number of stocks of pertinent expendable supplies of the predetermined classification is deducted from the storage place information of FIG. 5, a situation can be avoided in which the deduction of inventories is performed only for the first one record to be recognized by the management system 101 first and the other record is not recognized by the management system 101 and the deduction of inventories is not performed for the record permanently.

(Second Embodiment)

Figure 10:
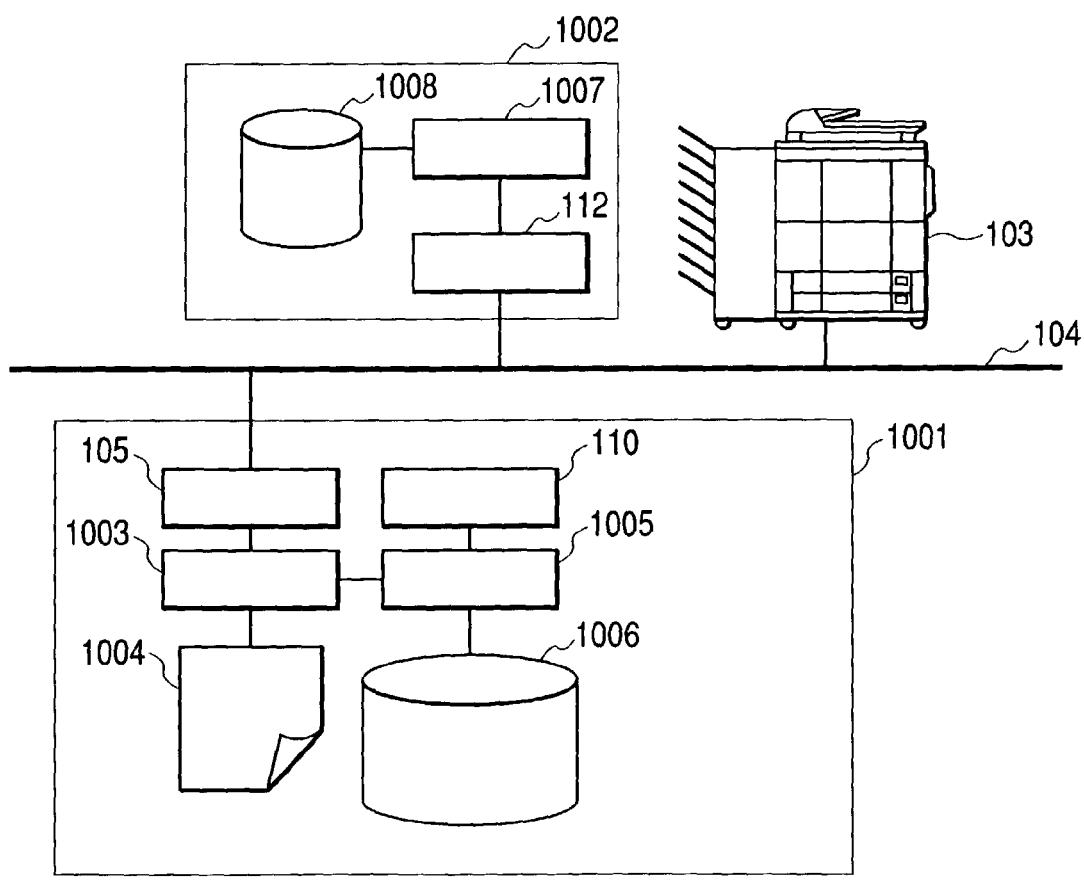
FIG. 10 is a diagram of a second embodiment of the present invention.

FIG. 10 is a diagram according to a second aspect of the present invention. Reference numerals 103, 104, 105, 110 and 112 denote the same components as those in the first embodiment. Reference numeral 1001 denotes a management system shown in the second embodiment; 1002, an external server holding product information; and 1003, a product information acquisition section for acquiring product information. Reference numeral 1004 denotes a connection information file of an acquisition destination of product information. Reference numeral 1005 denotes a management system program main body, which performs registration, management, deletion, and the like of a management object. Reference numeral 1006 denotes a DB for management of the management system program main body 1005, which manages a device and, at the same time, includes information for managing expendable supplies used by the device and the number of stocks thereof. Reference numeral 1007 denotes a data transmission section which receives a request from the management system 1001 and sends DB data thereto. Reference numeral 1008 denotes a DB including data to be sent to the management system 1001.

As in the first embodiment, the data shown in FIGS. 2, 4 and 5 is a part of the information included in the DB for management 1006. The DB for management 1006 also holds information shown in FIG. 12. Although this information has the same configuration as the information of FIG. 3 of the first embodiment, data to be held is only a model code of a device which is a management object. In addition, the information of FIG. 6 is data held in the DB 1008.

Figure 11:
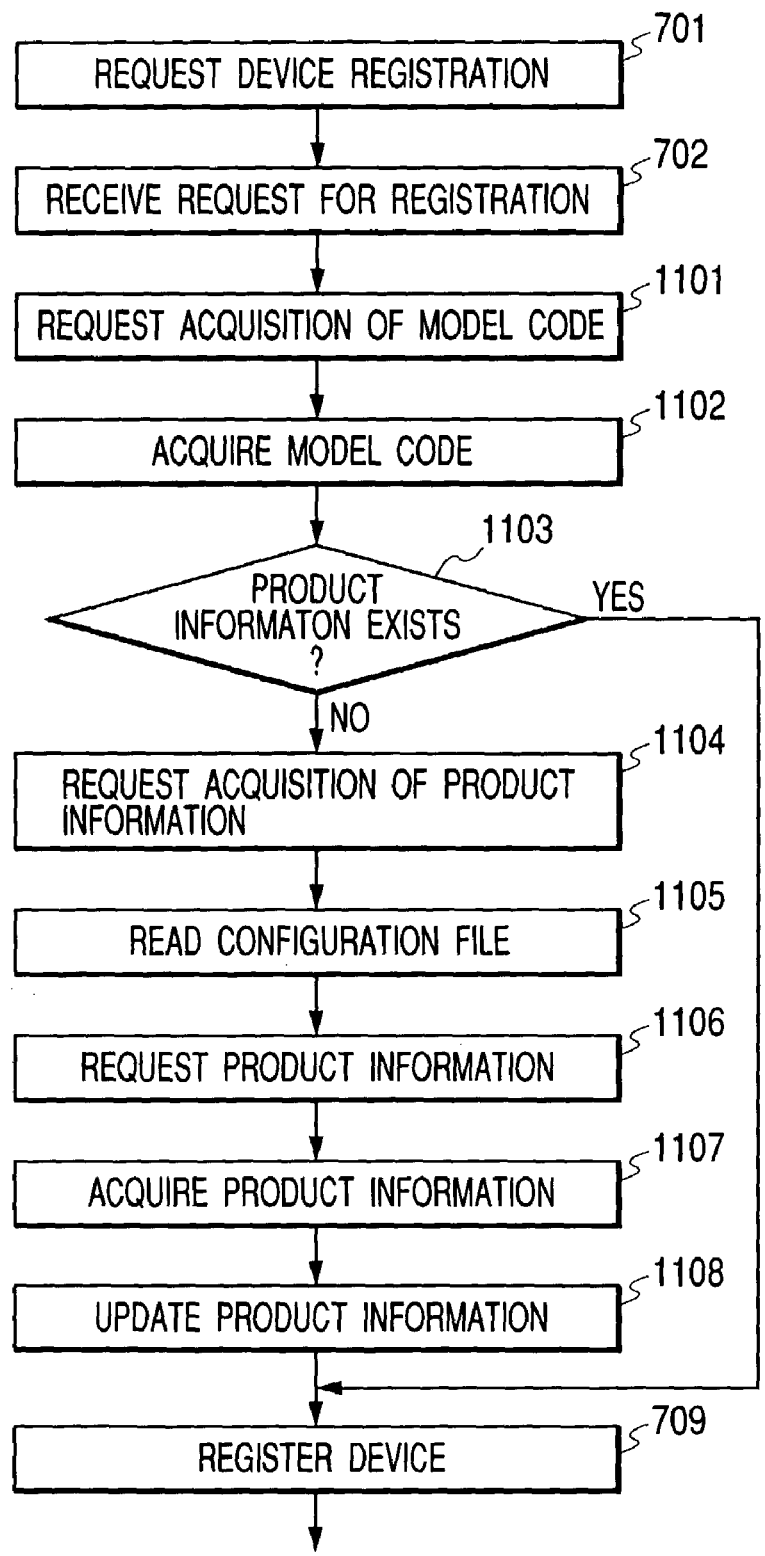
FIG. 11 is a flowchart of the second embodiment.

FIG. 11 shows a flowchart of this embodiment. Operations of this embodiment will be described with reference to this flowchart. As in the first embodiment, a request for registration of the device 103 is sent from the command processing section 110 (701). At this point, a storage place ID to be associated with information (IP address, etc.) connectable with a registered device is passed to the management system program main body 1005. The management system program main body 1005 receives the request for registration (702), passes the connection information to the product information acquisition section 1003, and requests the product information acquisition section 1003 to acquire a model code (1101). Upon receiving the request, the product information acquisition section 1003 acquires a model code from the device 103, which is connected to the network 104 via the communication control section 105, based upon the connection information, and returns the model code to the management system program main body 1005 (1002). This model code exists in the device 103 in advance and is transferred via an SNMP protocol. The model code is registered in determined MIB data in advance. Subsequently, the management system program main body 1005 confirms whether or not information of the model code exists in the information shown in FIG. 12 in the DB for management 1006 (1103). If the information does not exist, the management system program main body 1005 requests the product information acquisition section 1003 to acquire product information for the model code (1104). The product information acquisition section 1003 reads information of a server holding the product information of the connection information file 1004 (1105), makes connection to the external server 102 described in the information, and requests the data transmission section 1007 to acquire product information (1106). The data transmission section 1007 acquires the information from the DB 1008 and returns it to the product information acquisition section 1003. The product information acquisition section 1003 returns the information to the management system program main body 1005 (1107). FIG. 13 shows an example of data of the transferred product information. FIG. 13 includes a model code of a device and an expendable supplies code corresponding thereto, and further includes the number of expendable supplies corresponding to the device. Although the number of expendable supplies is one in FIG. 13, if there are a plurality of expendable supplies, a name of expendable supplies and a code of expendable supplies are also included in a plural form. Upon receiving this product information, the acquired product information is added to the information shown in FIG. 12 of the DB for management 1006 (1108). Thereafter, the method of registering the device is the same as that in the first embodiment.

A request for registration of a device of connection address of 10.1.1.22 with a storage place ID as 0001 is sent from the command processing section 110 and, as a result of the processing, FIG. 12 is updated. A result of the update of FIG. 12 is shown in FIG. 14. It is assumed that a model code of the device of 10.1.1.22 is MFPH0002. In this case, the product information data from the data transmission section 1007 is FIG. 13. When compared with the first embodiment, this embodiment is different in that only product information to be a management system object is held in a form of FIG. 3. However, a method of acquiring entire product information following the first embodiment can also be realized easily.

As described above, according to the flowchart of FIG. 11, in the case in which required production information does not exist in a management system when a management object is added in the management system, it becomes possible to acquire the product information from a server. Moreover, it becomes possible to acquire production information from the server periodically.

(Third Embodiment)

Figure 15:
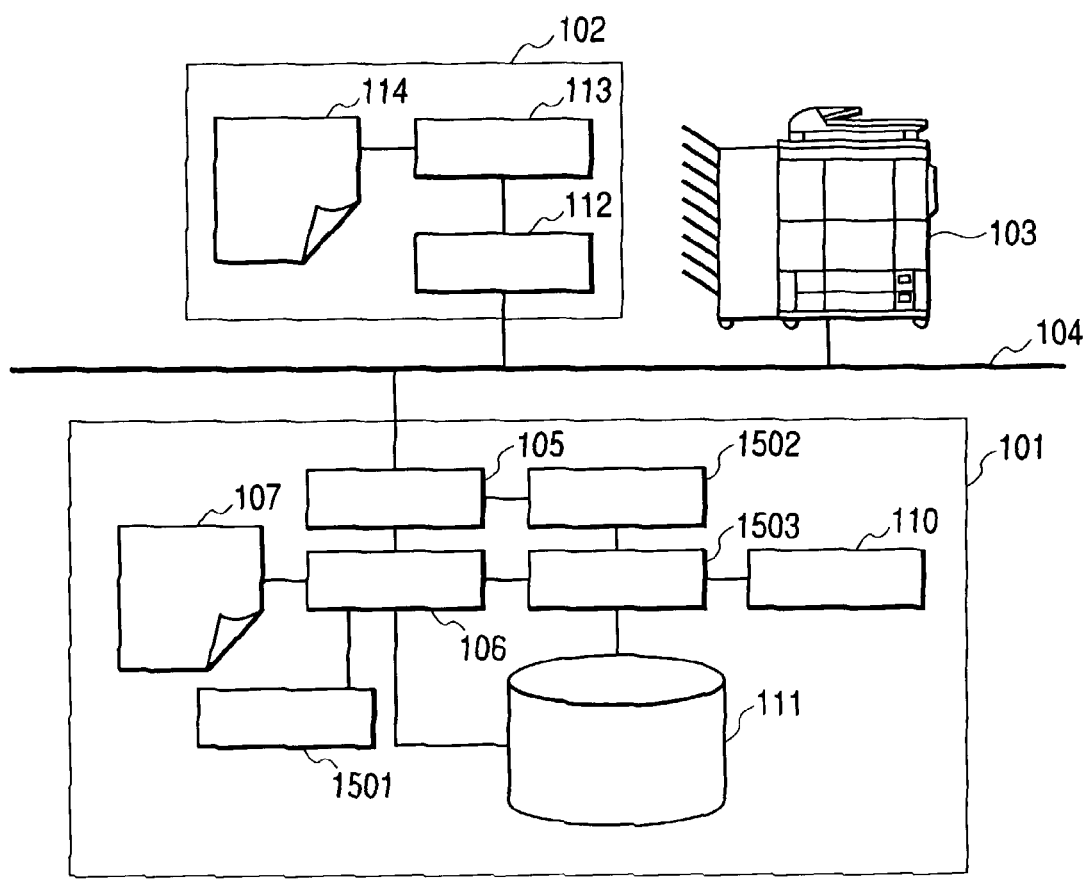
FIG. 15 is a diagram of a third embodiment of the present invention.

FIG. 15 is a diagram according to a third aspect of the present invention. Reference numerals 101, 102, 103, 104, 105, 106, 107, 110, 111, 112, 113 and 114 denote the same components as those in the first embodiment. Reference numeral 1501 denotes a task schedule section which periodically request the file transfer section 106 to execute a task, and 1502 denotes a device information acquisition section which acquires information from a device. Reference numeral 1503 denotes a management system program main body, which performs registration, management, deletion, and the like of a management object.

Figure 16:
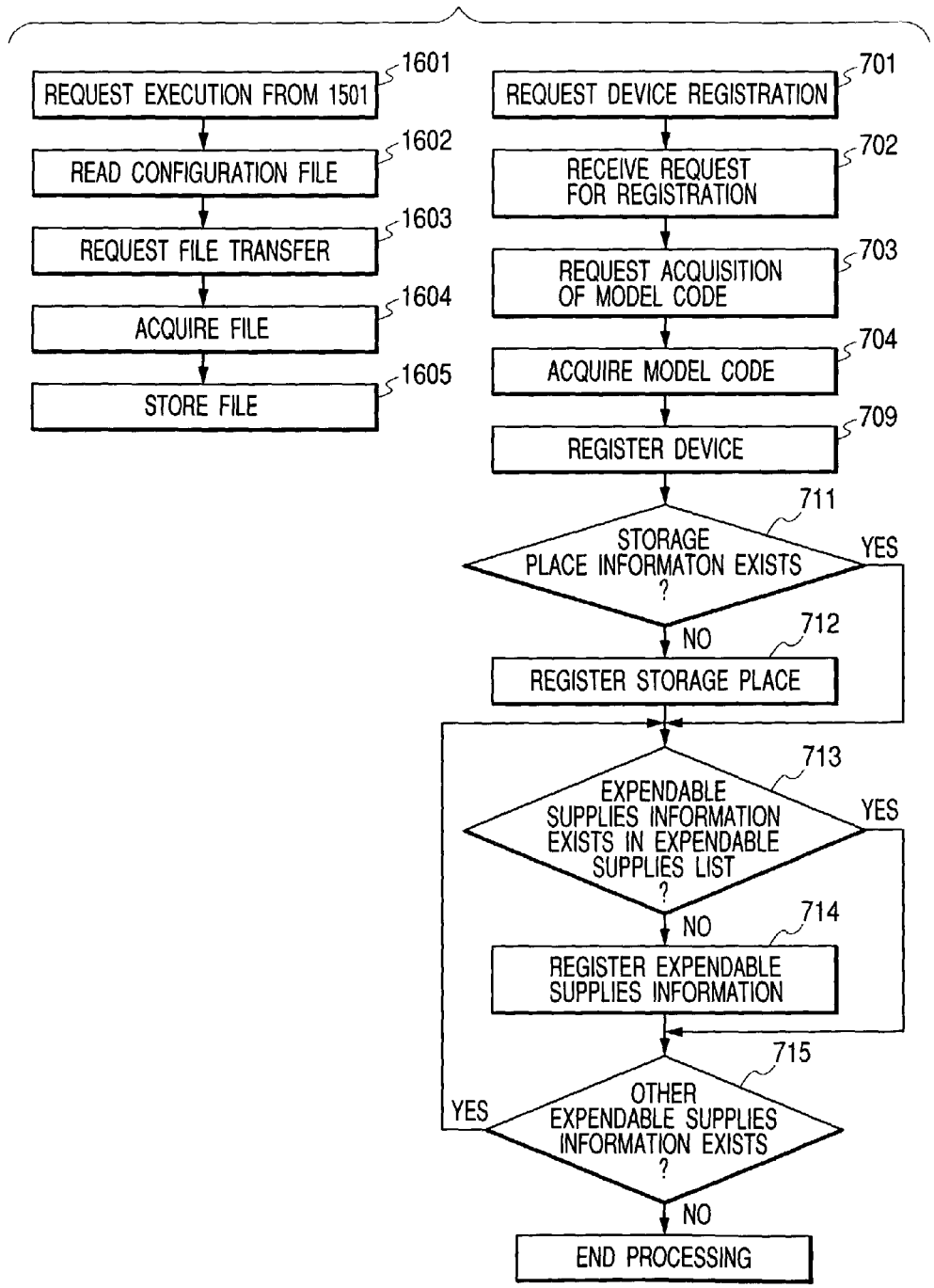
FIG. 16 is a flowchart of the third embodiment.

FIG. 16 shows a flowchart of this embodiment. In the figure, steps 701 to 704 and 709 to 715 are the same processing as that in FIG. 7. Operations of this embodiment will be described with reference to this flowchart. The task schedule section 1501 requires the file transfer section 106 to acquire product information periodically (1601). The file transfer section 106 reads information of a server which holds product information of the configuration file 107 (1602), makes connection to the external server 102 described in the information (1603), and acquires the product information (1604). The file transfer section 106 stores the transferred product information in the DB for management 111 (1605).

Independently from the processing of 1501, a request for registration of the device 103 is sent from the command processing section 110 (701). At this point, a storage place ID to be associated with information (IP address, etc.) connectable with a registered device is passed to the management system program main body 1503. The management system program main body 1503 receives the request for registration (702), passes the connection information to the device information acquisition section 1502, and requests the device information acquisition section 1502 to acquire a model code (703). Upon receiving the request, the device information acquisition section 1502 acquires a model code from the device 103, which is connected to the network 104 via the communication control section 105, based upon the connection information (704). This model code exists in the device 103 in advance and is transferred via an SNMP protocol. The model code is registered in determined MIB data in advance. The processing from step 709 of the first embodiment is performed based upon this model code and product information to be downloaded asynchronously by the task schedule section 1501.

In this embodiment, only the structure for acquiring product information asynchronously is described. However, it is also possible to adopt a structure in which the function of the second embodiment is combined with this embodiment to acquire product information periodically and, at the same time, even in the case in which information does not exist when it is required, to acquire product information.

Here, the respective reference numerals in FIGS. 1, 10 and 15 described in the first to third embodiments will be described briefly.

Reference numeral 101 denotes a management system; 102, an external server which holds product information; 103, a device; 104, a network; 105, a communication control section; 106, a file transfer section; 107, a configuration file; 108, a product information acquisition section; 109, a management system program main body; 110, a command processing section; 111, a DB for management; 112, a communication control section; 113, a data transmission section; 114, data; 1001, a management system; 1002, an external server which holds product information; 1003, a product information acquisition section; 1004, a connection information file of an acquisition destination of product information; 1005, a management system program main body; 1006, a DB for management; 1007, a data transmission section; 1008, a DB; 1501, a task schedule section; 1502, a device information acquisition section; and 1503, a management system program main body.

According to the first to third embodiments described above, in a system for managing a device and inventories of expendable supplies, in the case in which a new product is placed on the market and the product is registered in the management system, it becomes possible to update product information without manually registering the product information in the system. As a result, in the case in which management systems scattered all over the country are operated remotely, it becomes possible to register a device in the management systems without worrying about presence or absence of product information on registered devices on the management systems.

In addition, since at least a correspondence relationship between a model of a printer device and a classification of expendable supplies corresponding to the model is included in product information, even if a new product (printer device) is placed on the market, storage place information in which a storage place is associated with the new printer device as shown in FIG. 9 can be prepared with labor of a user reduced. For example, complicated work is made unnecessary in which the user visually judges whether or not a part number of expendable supplies of the new device is unregistered and, if the expendable supplies are those of an unregistered classification, determines in which storage place the consumable supplies are stored.

According to this embodiment, since a classification of expendable supplies is automatically specified based upon designation of a storage place and designation of a printer device which is desired to be registered anew additionally, it is judged whether or not an association between the specified classification of expendable supplied and the designated storage place is new, and the association is added if it is new and the association is not added if it is not new, occurrence of wrong storage place information including duplication can be prevented.

In addition, since updated product information can be acquired from the external server 102, correspondence information between a latest device model and a classification of expendable supplies corresponding to the device can be held in the management system 101, and a situation in which a classification of expendable supplies cannot be specified from a model code of a new product can also be prevented. This is considered to be particularly useful, for example, in the case in which a model code of a device can be acquired from the device but information on a classification of expendable supplies cannot be acquired. Note that examples in which information on a classification of expendable supplies cannot be acquired include the case in which a classification of expendable supplies often changes for a device of the same model.

On the other hand, in the case in which information on a classification of expendable supplies can be acquired from a printer device, in updating storage place information held in a holding unit of the management system 101 based upon an association between a designated storage place and a specified classification of expendable supplies, a classification of expendable supplied may be specified based upon the information on a classification of expendable supplies acquired from the printer device. In this way, there is also an effect that the above-described management of a storage place of expendable supplies can be performed without involving complicated work of an administrator.

(Other Embodiments)

The embodiments of the present invention have been described in detail. The present invention may be applied to a system constituted by a plurality of devices or may be applied to an apparatus consisting of one device.

Note that the present invention includes the case in which the objects of the present invention can also be attained by supplying a program of software for realizing the functions of the above-described embodiments (program corresponding to the flowchart shown in FIG. 7 in the above-described embodiments) directly or remotely from a system or an apparatus and a computer of the system or the apparatus reading out to execute a supplied program code. In that case, what the system or the apparatus uses for realizing the functions of the embodiments does not need to take a form of a program as long as it has a function of a program.

Therefore, in order to realize functional processing of the present invention with a computer, a program code itself to be installed in the computer also realizes the present invention. That is, a computer program itself for realizing the functional processing of the present invention is also included in the scope of the present invention.

In that case, the computer program may take any form such as an object code, a program to be executed by an interpreter, or a script data to be supplied to an OS as long as it has a function of a program.

As a recording medium for supplying a program, for example, there are a floppy (registered trademark) disk, a hard disk, an optical disk, a magneto-optical disk, an MO, a CD-ROM, a CD-R, a CD-RW, a magnetic tape, a nonvolatile memory card, a ROM, a DVD (DVD-ROM, DVD-R), and the like.

In addition, as a method of supplying a program, the program can also be supplied by making connection to a home page on the Internet using a browser of a client computer and downloading the computer program itself of the present invention or a file, which is compressed and includes an automatic install function, from the home page to a recording medium such as a hard disk. It is also possible to realize the functions of the above-described embodiments by dividing a program code constituting the program of the present invention into a plurality of files and downloading the respective files form different home pages. That is, a WWW server for causing a plurality of users to download a program file for realizing the functional processing of the present invention is also included in the scope of the present invention.

In addition, it is also possible to realize the functions of the above-described embodiments by encoding the program of the present invention, storing it in a storage medium such as a CD-ROM and distributing it to users, causing users having cleared predetermined conditions to download key information for decoding the program from a home page via the Internet and execute the encoded program using the key information to install it in a computer.

Further, the functions of the above-described embodiments can realized by a computer executing a read-out program, and besides, an OS or the like running on the computer performs a part or all of actual processing based upon an instruction of the program, and the functions of the above-described embodiments can also be realized by the processing.

Moreover, after a program read out from a recording medium is written in a memory provided in a function extended board inserted in a computer or a function extended unit connected to the computer, a CPU or the like provided in the function extended board or the function extended unit performs a part or all of actual processing based upon an instruction of the program, and the functions of the above-described embodiments can be realized by the processing.

As described above, according to the present invention, inventory management including management of a storage place of expendable supplies in an office or the like can be performed accurately.

What is claimed is:

1. An information processing apparatus comprising:
a holding unit comprising a memory configured to hold inventory information including one or more inventory information sets, wherein each of the inventory information sets includes a storage place identification, a type of an expendable supply, and a number of stocks of the expendable supply, wherein said information processing apparatus is provided with an inventory management function that performs a deduction of the number of stocks of the expendable supply included in each of the inventory information sets held by said holding unit;

a receiving unit configured to receive input information, which includes connection information of a color printing apparatus, the connection information comprising at least one of an IP address, an MAC address, and a device name of the color printing apparatus, and a storage place identification of the color printing apparatus, the input information being input when the color printing apparatus is newly set;

an acquisition unit configured to acquire a model code from the color printing apparatus by using the connection information included in the input information received by said receiving unit;

a specifying unit configured to specify, using the model code acquired by said acquisition unit from the color printing apparatus, a plurality expendable supplies used in the color printing apparatus, wherein said specifying unit executes the specifying by using a management table that includes one or more printing apparatus sets, each of the printing apparatus sets includes a model code, an expendable supply type, and a name of the expendable supply; and an updating unit configured to update the inventory information held in said holding unit when the color printing apparatus is newly set, wherein (i) in the event that the inventory information does not include an inventory information set with the storage place identification for the color printing apparatus received as the input information by said receiving unit and the plurality of types of expendable supplies specified by said specifying unit, said updating unit updates the inventory information by adding a new inventory information set which includes the storage place identification set as the storage place identification for the color printing apparatus received as the input information by said receiving unit, the plurality of types of expendable supplies specified by said specifying unit, and sets the number of stocks of the expendable supplies to zero, and (ii) in the event that the inventory information includes an inventory information set with the storage place identification for the color printing apparatus received as the input information by said receiving unit, and the plurality of types of expendable supplies specified by said specifying unit, said updating unit does not update the inventory information.

2. An information processing method comprising:
performing the following steps using a processor:
a holding step of holding, in a memory, inventory information including one or more inventory information sets, wherein each of the inventory information sets includes a storage place identification, a type of expendable supply, and a number of stocks of the expendable supply;

a receiving step of receiving input information, which includes connection information of a color printing apparatus, the connection information comprising at least one of an IP address, an MAC address, and a device name of the color printing apparatus, and a storage place identification of the color printing apparatus, the input information being input when the color printing apparatus is newly set;

an acquisition step configured to acquire a model code from the color printing apparatus by using the connection information included in the input information received by said receiving step;

a specifying step of specifying, using the model code acquired by said acquisition step from the color printing apparatus, a plurality of expendable supplies used in the color printing apparatus, wherein said specifying step executes the specifying by using a management table that includes one or more printing apparatus sets, each of the printing apparatus sets includes a model code, a type of an expendable code, and a name of the expendable supply; and an updating step of updating the inventory information held in said holding step when the color printing apparatus is newly set, wherein (i) in the event that the inventory information does not include an inventory information set with the storage place identification for the color printing apparatus received as the input information by said receiving step and the plurality of types of expendable supplies specified by said specifying step, in said updating step, the inventory information is updated by adding a new inventory information set which includes the storage place identification for the color printing apparatus received as the input information by said receiving step, the plurality of types of expendable supplies specified by said specifying step, and sets the number of stocks of the expendable supplies to zero, and (ii) in the event that the inventory information includes an inventory information set with the storage place identification for the color printing apparatus received as the input information by said receiving step and the plurality of types of expendable supplies specified by said specifying step, said updating step does not update the inventory information.

3. A non-transitory computer-readable storage medium storing a program, which, when executed by an information processing apparatus, causes the information processing apparatus to perform a method comprising the following steps:
a holding step of holding inventory information including one or more inventory information sets, wherein each of the inventory information sets includes a storage place identification, a type of expendable supply, and a number of stocks of the expendable supply;

a receiving step of receiving input information, which includes connection information of a color printing apparatus, the connection information comprising at least one of an IP address, an MAC address, and a device name of the color printing apparatus, and a storage place identification of the color printing apparatus, the input information being input when the color printing apparatus is newly set;

an acquisition step configured to acquire a model code from the color printing apparatus by using the connection information included in the input information received by said receiving step;

a specifying step of specifying, using the model code acquired by said acquisition step from the color printing apparatus, a plurality of expendable supplies used in the color printing apparatus, wherein said specifying step executes the specifying by using a management table that includes one or more printing apparatus sets, each of the printing apparatus sets includes a model code, a type of an expendable code, and a name of the expendable supply; and an updating step of updating the inventory information held in said holding step when the color printing apparatus is newly set, wherein (i) in the event that the inventory information does not include an inventory information set with the storage place identification for the color printing apparatus received as the input information by said receiving step and the plurality of types of expendable supplies specified by said specifying step, in said updating step, the inventory information is updated by adding a new inventory information set which includes the storage place identification for the color printing apparatus received as the input information by said receiving step, the plurality of types of expendable supplies specified by said specifying step, and sets the number of stocks of the expendable supplies to zero, and (ii) in the event that the inventory information includes an inventory information set with the storage place identification for the color printing apparatus received as the input information by said receiving step and the plurality of types of expendable supplies specified by said specifying step, said updating step does not update the inventory information.

* * * * *